UNITED STATES PATENT OFFICE.

HAROLD HIBBERT, HARRY ESSEX, AND BENJAMIN T. BROOKS, OF PITTSBURGH, PENNSYLVANIA, ASSIGNORS TO GULF REFINING COMPANY, OF PITTSBURGH, PENNSYLVANIA, A CORPORATION OF TEXAS.

PROCESS FOR THE MANUFACTURE OF FUSEL-OIL OR SIMILAR PRODUCTS FROM PETROLEUM.

1,214,919.      Specification of Letters Patent.      Patented Feb. 6, 1917.

No Drawing.      Application filed April 3, 1915. Serial No. 19,876.

*To all whom it may concern:*

Be it known that we, HAROLD HIBBERT, HARRY ESSEX and BENJAMIN T. BROOKS, residing severally at Pittsburgh, Allegheny county, State of Pennsylvania, have invented certain new and useful Improvements in Processes for the Manufacture of Fusel-Oil or Similar Products from Petroleum; and we do hereby declare the following to be a full, clear, and exact description of the invention, such as will enable others skilled in the art to which it appertains to make and use the same.

This invention relates to the manufacture from petroleum of a product having in the industrial arts the principal capabilities of use of fusel oil and similar products.

Gasolene is first submitted to a preliminary fractionation and the distillate having a boiling point of 25° C.–75° C. is chlorinated in such a manner that mono-chlorids are the chief products. To this end, the distillate is vaporized and is conducted, in admixture with chlorin into the upper part of a long glass tube. The distillate vapors are in excess (i. e., there is more than one molecule of the petroleum distillate to one molecule of chlorin). It is found that under these conditions and when the reaction is carried out in diffused daylight (say indirect north light), the chief products are the mono-chlorids. More intense illumination or less than an excess of the gasolene vapors tends to the production of dichlorids.

The pentyl and hexyl mono-chlorids thus produced may then be treated in accordance with either one of the following methods:

(a) They may be subjected to the action of alkali or alkali carbonate solution, under a pressure within the range of 1000 pounds to 4000 pounds per square inch, and at a temperature within the range of 180° C. to 280° C. In most instances, it will be preferable to employ a pressure of say 3000 pounds per square inch and a temperature of 220° C., and under these specific conditions we have obtained a yield of 40% of fusel oil; but the range of pressures and temperatures may be varied, as indicated. In general, the higher the pressure and the lower the temperature within the range stated, the greater will be the yield of alcohols. The pressure may be obtained by the heat employed in raising the charge to the desired temperature. In some instances, however, the pressure can be increased without unduly raising the temperature, by adding to the charge a light volatile liquid, such as ordinary ether.

It is found that the employment of these high pressures, results in the production of materially increased yields of alcohol. Nevertheless, a considerable quantity of the original alkyl chlorids is converted into olefins (amylenes and hexylenes). These olefins can be separated from the reaction mixture by fractional distillation and converted into the corresponding alcohols by subjecting the mixture to the action of dilute sulfuric acid, in the cold, (that is to say, at substantially 0° C.), the sulfuric acid chosen consisting of approximately 50 parts by volume of commercial $H_2SO_4$ of a specific gravity of 1.84. The total yield of alcohols is, therefore, increased, by this treatment, by the addition of the alcohols derived from the converted olefins. The alcohols may then be separated from the sulfuric acid solution by adding thereto 10 volumes of ice water, taking care that the temperature remains at substantially 0° C.; whereupon the mixture of alcohols will separate out more or less completely and may be decanted or otherwise removed. After removing the alcohol layer, a further quantity of alcohol may be obtained by partially distilling the diluted aqueous-acid solution as such, and also the amyl sulfuric esters are hydrolyzed to alcohol. The mixture of alcohols may then be subjected to fractional distillation, for the recovery of the fraction having a boiling point of 90° C.–175° C.

(b) The mixture of pentyl and hexyl mono-chlorids may be heated under a pressure of 300 pounds or more per square inch, and at a temperature ranging from 170° C. to 250° C., with sodium acetate, either with or without a solvent such as alcohol or acetic acid. By this procedure the two chief products obtained are: first, a mixture of the corresponding pentyl and hexyl acetates, and, secondly, a mixture of olefins (amylenes and hexylenes). If desired, the pentyl and hexyl acetates may be converted into the corresponding alcohols, by hydrolysis, or by saponification, in any well-known way. The mixture, obtained as above, may be fractionally distilled and the fraction consisting of olefins boiling at 25° C.–75° C., may then be treated with dilute sulfuric acid in the cold to convert these olefins into the corresponding alcohols.

It has heretofore been proposed to subject the mono-chlorids of pentane and hexane to the action of boiling aqueous alkali at atmospheric pressure, but this operation has practically no effect upon the said mono-chlorids either for the formation of olefins or alcohols. So also, at lower super-atmospheric pressures than those herein specified, the chlorin may be split off from the mono-chlorids but the resultant product consists mainly of olefins with relatively smaller yields of alcohols. On the other hand, by employing the high pressures hereinbefore specified, the yield of alcohols is very considerably increased, and the final conversion into alcohols of the olefins incidentally produced gives a net result in total yield of alcohols such that the procedure becomes commercially profitable.

What we claim is:

1. The method of producing a fusel oil product containing a mixture of hexyl alcohol and of pentyl alcohols, which comprises subjecting a petroleum distillate containing pentanes and hexanes to the action of chlorin under conditions to form mono-chlorids as the chief products of the operation, and subjecting the resulting chlorinated product containing a mixture of pentyl and hexyl mono-chlorids, at high pressure and moderate temperature to the action of a reagent capable of converting it in part into a mixture of alcohols containing pentyl and hexyl alcohols; substantially as described.

2. The method of producing a fusel oil product containing a mixture of hexyl alcohol and of pentyl alcohols, which comprises subjecting a petroleum distillate containing pentanes and hexanes to the action of chlorin under conditions to form mono-chlorids as the chief products of the operation, and subjecting the resulting chlorinated product containing a mixture of pentyl and hexyl mono-chlorids, at high pressure and moderate temperature to the action of an acetate capable of converting it in part into a mixture of alcohols containing pentyl and hexyl alcohols; substantially as described.

3. The method of producing a fusel oil product containing a mixture of pentyl and hexyl alcohols, which comprises subjecting a petroleum distillate containing pentanes and hexanes to the action of chlorin under conditions to form mono-chlorids as the chief products of the operation, subjecting the chlorinated product containing a mixture of pentyl and hexyl mono-chlorids, at high pressure and moderate temperature, to the action of an acetate, and thereby producing a mixture of pentyl and hexyl alcohols and of olefins, and subjecting the olefins to the action of dilute sulfuric acid and subsequent hydrolysis to produce a further amount of pentyl and hexyl alcohols; substantially as described.

4. The method of producing a fusel oil product containing a mixture of hexyl alcohol and of pentyl alcohols, which comprises subjecting a petroleum distillate containing pentanes and hexanes to the action of chlorin under conditions to form mono-chlorids as the chief products of the operation, and subjecting the resulting chlorinated product containing a mixture of pentyl and hexyl mono-chlorids, under a pressure as high as 300 pounds per square inch, and at a temperature within the range of about 170° C. to 250° C., to the action of an acetate, and thereby producing a mixture of pentyl and hexyl alcohols and of olefins, and subjecting the olefins to the action of dilute sulfuric acid and subsequent hydrolysis to produce a further amount of pentyl and hexyl alcohols; substantially as described.

5. The method of producing a fusel oil product containing a mixture of pentyl and hexyl alcohols, which comprise subjecting a petroleum distillate having a boiling point of 25° C. to 75° C., and containing pentanes and hexanes to the action of chlorin under suitable conditions to produce a product made up principally of pentane and hexane mono-chlorids, and subjecting the resulting mixture to the action of an acetate under a pressure as high as 300 pounds per square inch, and at a temperature within the range of about 170° C. to 250° C. and thereby converting the chlorinated mixture in part into a mixture of pentyl and hexyl alcohols, and recovering the mixture of alcohols by fractional distillation; substantially as described.

In testimony whereof we affix our signatures, in presence of two witnesses.

HAROLD HIBBERT.
HARRY ESSEX.
BENJAMIN T. BROOKS.

Witnesses:
E. GALBRAITH,
E. C. CHANCE.